US007986317B2

(12) United States Patent
Kim

(10) Patent No.: US 7,986,317 B2
(45) Date of Patent: Jul. 26, 2011

(54) ORGANIC LIGHT EMITTING DISPLAY AND DRIVING METHOD THEREOF, INCLUDING COMPENSATING TO DISPLAY IMAGES OF DESIRED LUMINANCE

(75) Inventor: Do-ik Kim, Suwon-si (KR)

(73) Assignee: Samsung Mobile Display Co., Ltd., Suwon-si, Gyeonggi-do (KR)

( * ) Notice: Subject to any disclaimer, the term of this patent is extended or adjusted under 35 U.S.C. 154(b) by 994 days.

(21) Appl. No.: 11/896,514

(22) Filed: Sep. 4, 2007

(65) Prior Publication Data

US 2008/0158218 A1 Jul. 3, 2008

(30) Foreign Application Priority Data

Jan. 3, 2007 (KR) ........................ 10-2007-0000634

(51) Int. Cl.
*G06F 3/038* (2006.01)

(52) U.S. Cl. ........................................................ 345/212

(58) Field of Classification Search ........................ None
See application file for complete search history.

(56) References Cited

U.S. PATENT DOCUMENTS 3,921,162 A * 11/1975 Fukai et al. .................. 345/101
6,714,179 B1 3/2004 Waterman
2002/0130786 A1* 9/2002 Weindorf ................ 340/815.45
2002/0186192 A1* 12/2002 Maruoka et al. ................ 345/87
2003/0076056 A1* 4/2003 Schuurmans ................ 315/291
2003/0146912 A1* 8/2003 Sung et al. .................... 345/212
2003/0234794 A1* 12/2003 Kanai .......................... 345/600
2004/0032382 A1* 2/2004 Cok et al. ........................ 345/82
2006/0028155 A1* 2/2006 Young .......................... 315/308

FOREIGN PATENT DOCUMENTS

JP 2003-084728 3/2003
KR 10-2002-0068938 A 8/2002
KR 10-2004-0103281 12/2004
KR 10-2006-0082476 7/2006
WO WO 02/31802 4/2002

* cited by examiner

*Primary Examiner* — Alexander Eisen
*Assistant Examiner* — Matthew Yeung
(74) *Attorney, Agent, or Firm* — Lee & Morse, P.C.

(57) ABSTRACT

An display and a driving method thereof are capable of displaying images of desired luminance. The display includes a scan driver connected to scan lines, a data driver connected to data lines, pixels connected to the scan lines and the data lines, the pixels being adapted to generate light while supplying an electric current from a first power source to a second power source, a power source unit for generating the first power source, and a compensating unit adapted to control a voltage value of the first power source.

19 Claims, 5 Drawing Sheets

LUT

| TEMPERATURE | CONTROL VALUE |
|---|---|
| 20 | 20 |
| 21 | 19 |
| 22 | 18 |
| ⋮ | ⋮ |
| 60 | 1 |

ORGANIC LIGHT EMITTING DISPLAY AND DRIVING METHOD THEREOF, INCLUDING COMPENSATING TO DISPLAY IMAGES OF DESIRED LUMINANCE

BACKGROUND OF THE INVENTION

1. Field of the Invention

The present embodiments relate to a display and a driving method thereof. More particularly, the present embodiments relate to an organic light emitting display and a driving method thereof, which display images of desired luminance.

2. Description of the Related Art

Various flat panel displays are capable of reducing the weight and volume that are disadvantages of cathode ray tubes (CRTs). Flat panel displays include liquid crystal displays (LCDs), field emission displays (FEDs), plasma display panels (PDPs), and organic light emitting diode (OLED) displays.

Among the flat panel displays, the OLED displays employ organic light emitting diodes that emit light by re-combination of electrons and holes. The OLED displays have advantages of high response speed and small power consumption.

FIG. 1 illustrates a view showing a pixel 4 of a related art OLED display.

With reference to FIG. 1, the pixel 4 of the related art OLED display may include an OLED and a pixel circuit 2. The pixel circuit 2 may be connected to a data line Dm and a scan line Sn, and may control the OLED. The pixel circuit 2 may be connected to a first power source ELVDD directly, and to a second power source ELVSS through the OLED.

An anode electrode of the OLED may be connected to the pixel circuit 2, and a cathode electrode of the OLED may be connected to the second power source ELVSS. The OLED may generate light of a predetermined luminance corresponding to an electric current from the pixel circuit 2.

When a scan signal is supplied to the scan line Sn, the pixel circuit 2 may control an amount of an electric current provided to the OLED corresponding to a data signal provided to the data line Dm. To do this, the pixel circuit 2 may include a first transistor M1, a second transistor M2, and a storage capacitor C. The first transistor M1 may be connected between the data line Dm and the scan line Sn. The second transistor M2 may be connected between a first power source ELVDD and the OLED. The storage capacitor C may be connected between a gate electrode and a first electrode of the second transistor M2.

A gate electrode of the first transistor M1 may be connected to the scan line Sn, and a first electrode of the first transistor M1 may be connected to the data line Dm. A second electrode of the first transistor M1 may be connected with one terminal of the storage capacitor C. The first electrode may be set as a source electrode or a drain electrode, and the second electrode may be set as an electrode other than the first electrode. When the first electrode is set as the source electrode, the second electrode may be set as the drain electrode. When a scan is supplied to the first transistor M1 connected with the scan line Sn and the data line Dm, the first transistor M1 may be turned-on to provide a data signal from the data line Dm to the storage capacitor C. At this time, the storage capacitor C may be charged with a voltage corresponding to the data signal.

A gate electrode of the second transistor M2 may be connected to one terminal of the storage capacitor C, and a first electrode of the second transistor M2 may be connected to another terminal of the storage capacitor C and the first power source ELVDD. A second electrode of the second transistor M2 may be connected with the anode electrode of the OLED.

The second transistor M2 may control an amount of an electric current flowing from the first power source ELVDD to the second power source ELVSS through the OLED according to the voltage charged in the storage capacitor C. The OLED may emit light corresponding to an amount of an electric current supplied from the second transistor M2.

The pixel 4 of the related art OLED display may display images of desired luminance by repeating the aforementioned procedure. During digital driving in which the second transistor M2 functions as a switch, a voltage of the first power source ELVDD and a voltage of the second power source ELVSS may be supplied to the OLED. The OLED may thus emit light by being driven with a regulated voltage. As time elapses, an internal resistance of the OLED may increase, and a drive current may be reduced to not display images of desired luminance. With sufficient time, the OLED may degrade. When the OLED degrades, the luminance may be reduced, in relation to the same electric current employed previously. This may cause the images of desired luminance not to be displayed.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present embodiments are therefore directed to a display and a method for driving the same which substantially overcomes one or more of the problems due to the limitations and disadvantages of the related art.

It is therefore a feature of an embodiment of the present invention to provide a display and method for driving the same capable of displaying images of desired luminance.

At least one of the above and other features and advantages of the present invention may be realized by providing a display, which may include a scan driver connected to scan lines, a data driver connected to data lines, pixels connected to the scan lines and the data lines, the pixels being adapted to generate light while applying an electric current from a first power source to a second power source, a power source unit adapted to generate the first power source, and a compensating unit adapted to control a voltage value of the first power-source.

The compensating unit may be adapted to control the voltage of the first power source according to an amount of the electric current applied to the pixels. The compensating unit may be adapted to control the voltage of the first power source at least once when the first and second power sources are applied to the display. The compensating unit may include a resistor between the power source unit and the pixels, an amplifier adapted to amplify a voltage across the resistor, a reference voltage generator adapted to generate a reference voltage, a comparator adapted to compare the amplified voltage with the reference voltage, a counter adapted to generate a counter signal counting up or down a count according to a comparison result of the comparator, and a controller adapted to supply a feedback signal to the power source unit, the feedback signal being generated in accordance with the counter signal. The compensating unit may be adapted to apply the reference voltage across the resistor when the pixels emit full white light during an initial drive, and to set the reference voltage to be substantially identical to the voltage amplified by the amplifier. The comparator may be adapted to generate the counter signal so that the amplified voltage from the amplifier becomes substantially identical to the reference voltage. The compensating unit may also include a temperature sensor adapted to measure a temperature of a panel, and a look-up table adapted to store control values corresponding to the temperature measured by the temperature sensor. The control values may be set to be reduced as the temperature is increased. The controller may be adapted to extract a control value from the look-up table according to the temperature, and the controller may be adapted to sum up the extracted control value and the counter signal to generate the compensating signal. The power source unit may be adapted to control a voltage of the first power source according to the feedback signal.

The power source unit may include a red power source unit adapted to generate a first red power source supplied to red pixels, a green power source unit adapted to generate a first green power source supplied to green pixels, and a blue power source unit adapted to generate a first blue power source supplied to blue pixels. The compensating unit may include a red compensating unit adapted to control the voltage of the first red power source, a green compensating unit adapted to control the voltage of the first green power source, and a blue compensating unit adapted to control the voltage of the first blue power source, when a power source is input to the organic light emitting display. Each of the red compensating unit, the green compensating unit, and the blue compensating unit may include a resistor between the red power source unit, the green power source unit, or the blue power source unit and the pixels, an amplifier adapted to amplify a voltage across the resistor, a reference voltage generator adapted to generate a reference voltage, a comparator adapted to compare the amplified voltage from the amplifier with the reference voltage, a counter adapted to generate a counter signal counting up or down a count according the comparison result of the comparator, a controller adapted to transfer the counter signal to a digital-to-analog converter as a compensating signal, and the digital-to-analog converter is adapted to convert the compensating signal into an analog signal. The comparator may be adapted to generate the counter signal so that the amplified voltage from the amplifier becomes substantially identical to the reference voltage. The compensating unit may include a temperature sensor adapted to measure a temperature of a panel, and a look-up table installed in each of the red compensating unit, the green compensating unit, and the blue compensating unit, the look-up table being adapted to store control values corresponding to the temperature measured by the temperature sensor. The compensating unit may be adapted to set the control values to be reduced as the temperature is increased. The controller may be adapted to extract the control values from the look-up table according to the temperature, and to sum up the extracted control values and the counter signal to generate the compensating signal.

At least one of the above and other features and advantages of the present invention may be realized by providing a method for driving, which may include driving pixels of a display adapted to generate light by supplying an electric current from a first power source to a second power source, generating the first power source by a power source unit, generating a compensating signal in accordance with an amount of an electric current supplied to the pixels, and controlling a voltage of the first power source output by the power source unit according to the compensating signal.

The compensating unit may control the voltage of the first power source at least once when the first and second power sources are applied to the display. The method may further include amplifying a voltage across a resistor between the first power source and the pixels, comparing the amplified voltage with a reference voltage, and generating a counter signal according to a comparison result so that the amplified voltage becomes substantially identical to the reference voltage, transferring the counter signal to a digital-to-analog converter as the compensating signal, and supplying the compensating signal from the digital-to-analog converter to the power source unit. The method may further include measuring a temperature of a panel, and extracting a control value stored in a look-up table corresponding to the measured temperature of the panel, and summing the control value and the counter signal to generate the compensating signal. The control value may be reduced as the temperature is increased.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
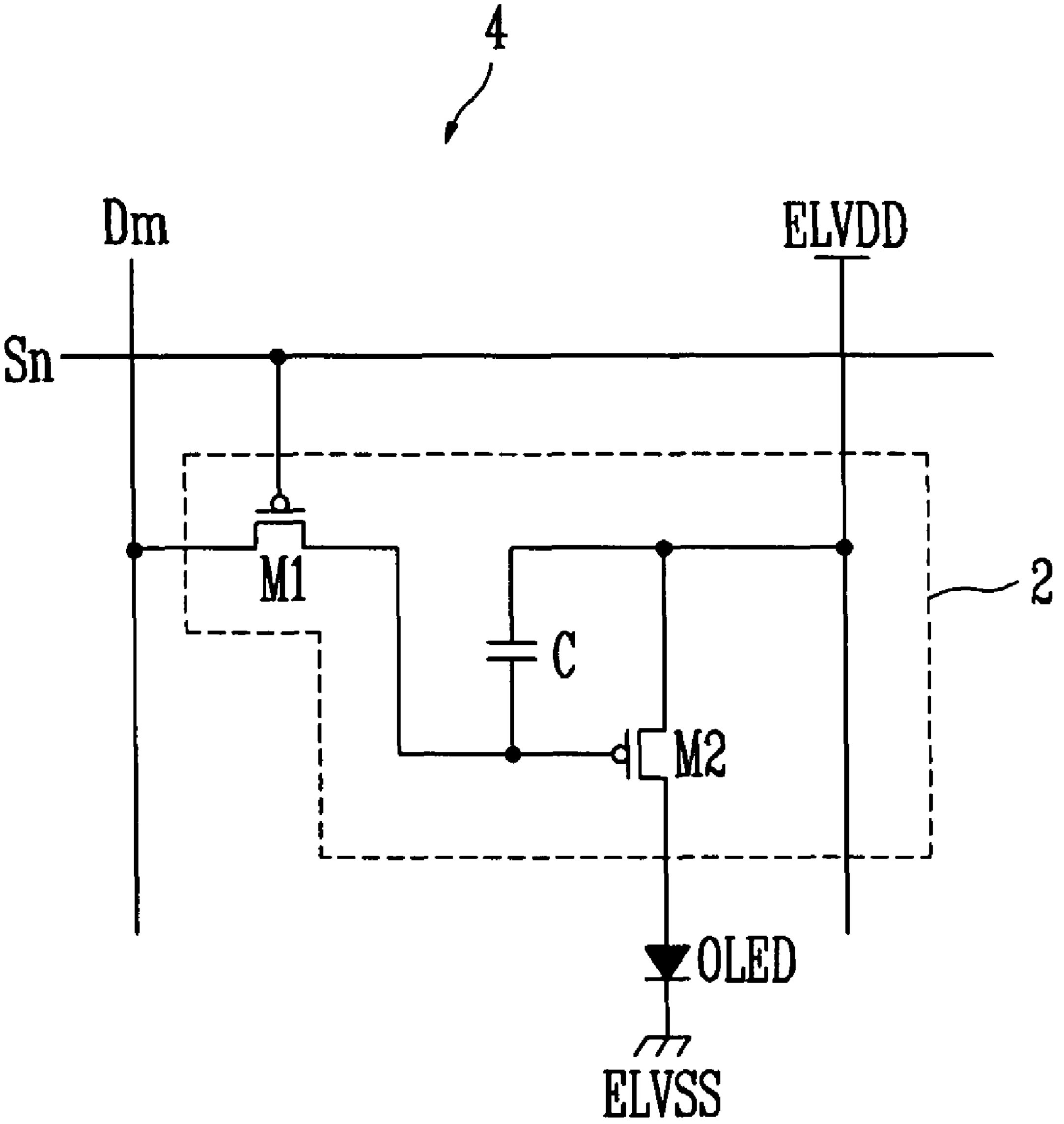
FIG. 1 illustrates a view of a pixel of a related art OLED display.

Korean Patent Application No. 10-2007-0000634, filed on Jan. 3, 2007, in the Korean Intellectual Property Office, and entitled: "Organic Light Emitting Display and Driving Method Thereof," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

Hereinafter, preferable embodiments according the present invention will be described with reference to the accompanying drawings, namely, FIG. 2 to FIG. 6. When one element is connected to another element, one element may be not only directly connected to another element, but also indirectly connected to another element via another element. Irrelevant elements may be omitted for clarity. Like reference numerals refer to like elements throughout.

In an display and a method for driving the same, a voltage of a first power source may be controlled so that pixels may generate light of desired luminance. Accordingly, the display may display images of desired luminance regardless of any degradation of, e.g., an OLED. Furthermore, since an analog-to-digital converter (ADC) and an electrically erasable programmable read only memory (EEPROM) may not be used in a compensating unit, manufacturing cost may be reduced.

Figure 2:
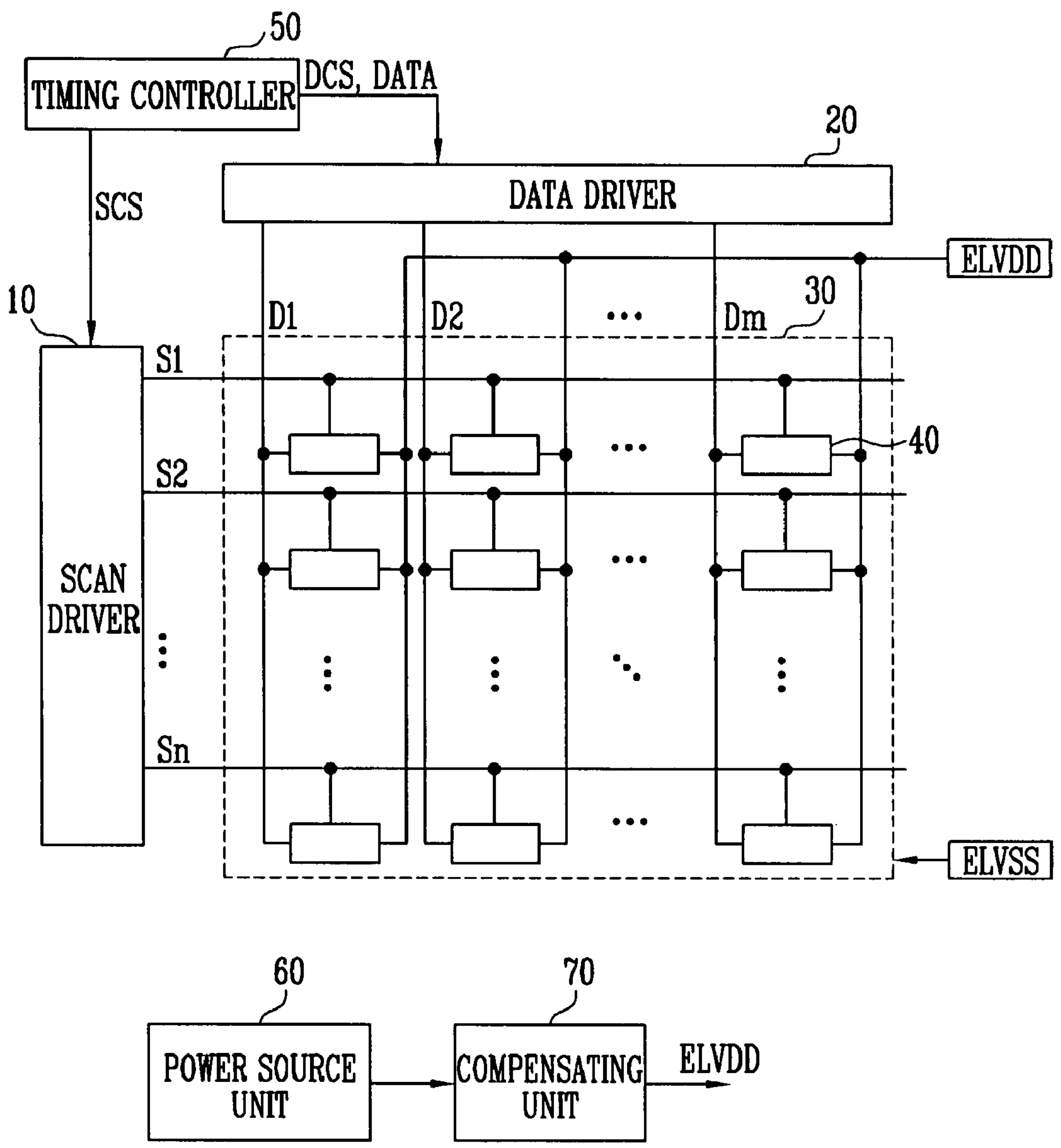
FIG. 2 illustrates a view of an OLED display according to an embodiment of the present invention.

FIG. 2 illustrates a view of a display according to an embodiment of the present invention With reference to FIG. 2, the organic light emitting display may include a pixel portion 30 having pixels 40, a scan driver 10, a data driver 20, a timing controller 50, a power source unit 60, and a compensating unit 70. The pixels 40 may be connected to scan lines S1, S2 . . . Sn and data lines D1, D2 . . . Dm. The scan driver 10 may drive the scan lines S1, S2 . . . Sn. The data driver 20 may drive the data lines D1, D2 . . . Dm. The timing controller 50 may control the scan driver 10 and the data driver 20. The power source unit 60 may generate a voltage of a first power source ELVDD. The compensating unit 70 may control the voltage of the first power source ELVDD in order to supply a desired electric current.

The timing controller 50 may generate a data driving signal DCS and a scan driving signal SCS corresponding to externally supplied synchronizing signals. The data driving signal DCS generated by the timing controller 50 may be provided to the data driver 20, and the scan driving signal SCS may be provided to the scan driver 10. The timing controller 50 may provide externally supplied data DATA to the data driver 20.

The scan driver 10 may sequentially supply a scan signal to the scan lines S1, S2 . . . Sn. When the scan signal is sequentially supplied to the scan lines S1, S2 . . . Sn, the pixels 40 may be sequentially selected by lines, and the selected pixels 40 may receive a data signal from the data lines D1, D2 . . . Dm.

The data driver 20 may supply a data signal to the data lines D1, D2 . . . Dm. The data signal may be supplied to the pixels selected by the scan signal to synchronize with the scan signal. The pixel portion 30 may receive externally supplied power from the first power source ELVDD, and from the second power source ELVSS, and provide them to the pixels 40. After the pixels 40 receive the power of the first power source ELVDD and the power of the second power source ELVSS, when the scan signal is supplied, the pixels 40 may receive a data signal, and may supply an electric current from the first power source ELVDD to the second power source ELVSS through a light emitting element, e.g., an OLED. To do this, the first power source ELVDD may be set to have a voltage greater than that of the second power source ELVSS.

The power source unit 60 may generate the first power source ELVDD having a predetermined voltage. When the voltage of the first power source ELVDD is supplied to the compensating unit 70, the compensating unit 70 may supply an electric current to the pixels 40, and the compensating unit 70 may control a voltage of the first power source ELVDD to correspond to the sensed electric current. The compensating unit 70 may control the voltage of the first power source ELVDD to supply a desired electric current to the pixels 40 each time a voltage is supplied to the organic light emitting display.

Figure 3:
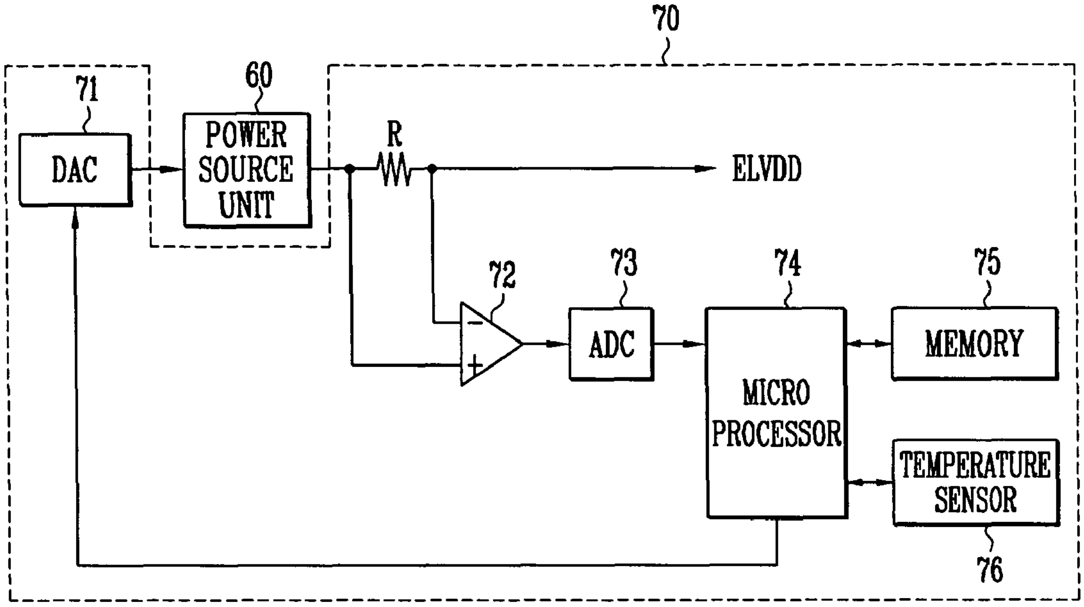
FIG. 3 illustrates a view of a first example of a compensating unit shown in FIG. 2.

FIG. 3 illustrates a view of a first example of the compensating unit 70 shown in FIG. 2.

With reference to FIG. 3, the compensating unit 70 may include a resistor R, an amplifier 72, an analog-to-digital converter (ADC) 73, a micro processor 74, a memory 75, a temperature sensor 76, and a digital-to-analog converter (DAC) 71.

The power source unit 60 may generate the first power source ELVDD having a predetermined voltage. To do this, the power source unit 60 may be a DC-DC converter.

The resistor R may be between the power source unit 60 and the ELVDD supplied to the pixels 40 (see FIG. 2). When the first power source ELVDD generated by the power source unit 60 is supplied to the pixels 40, a predetermined voltage may be applied across the resistor R by an electric current flowing to the resistor R.

The amplifier 72 may amplify the voltage across the resistor R. The amplified voltage may be supplied to the ADC 73. The ADC may 73 convert the voltage from the amplifier 72 into a digital signal, and may provide the digital signal to the micro processor 74.

The memory 75 may store initial current values of the pixels 40. The initial current values may be set to be an electric current, which flows to the resistor R during an initial driving of the display. The initial current values may be set to be an electric current flowing when the pixels 40 emit full white light.

The temperature sensor 76 may measure a temperature of a panel of the display, and may provide the measured temperature data to the micro processor 74.

The micro processor 74 may compare the digital signal from the ADC 73 with initial current values stored in the memory 75, and may provide a compensating signal to the DAC 71 according to the comparison result. Here, the compensating signal may be determined so that the digital signal may be identical with the initial current value.

The DAC 71 may convert the compensating signals into an analog signal, and may provide the converted analog signal to the power source unit 60. Accordingly, the power source unit 60 may control the voltage of the first power source ELVDD according to the compensating signal.

The operation will be explained in detail. During an initial drive of the display, the pixels 40 may emit light of predetermined luminance, e.g., full white. A voltage drop across the resistor R may be converted into a digital signal, and the digital signal may be stored in the memory 75 as an initial current value.

Next, power may be supplied to the display, and the pixels 40 may be set to emit full white light. A voltage applied to the resistor R may be converted into a digital signal, and the digital signal may be supplied to the micro processor 74. When the micro processor 74 receives the digital signal, the micro processor 74 may compare a digital signal value with the initial current value. The micro processor 74 may generate and provide a compensating signal to the DAC 71 so that the compared values are substantially identical with each other. The power source unit 60 may adjust the voltage of the first power source ELVDD according to the compensating signal so that the pixels may display images of a desired luminance. Then, the compensating unit 70 may not be driven, but the pixels 40 may be normally driven to display images of the desired luminance.

The micro processor 74 may generate the compensating signal according to the temperature data from the temperature sensor 76.

Since the first embodiment of the present invention controls the voltage of the first power source ELVDD to flow a desired electric current through the pixels 40, images of desired luminance may be displayed irrespective of the degradation of the OLED.

However, in the first embodiment of the present invention, because the ADC 73 is used, it may be difficult to mount the ADC 73 on one integrated circuit (IC). When the ADC 73 is mounted on the chip, manufacturing cost may be increased. Furthermore, in the first embodiment of the present invention, initial current values are stored, and an EEPROM may be used to read the initial current values as the memory 75. When the EEPROM is used, the manufacturing cost may be further increased.

Figures 4, 5:
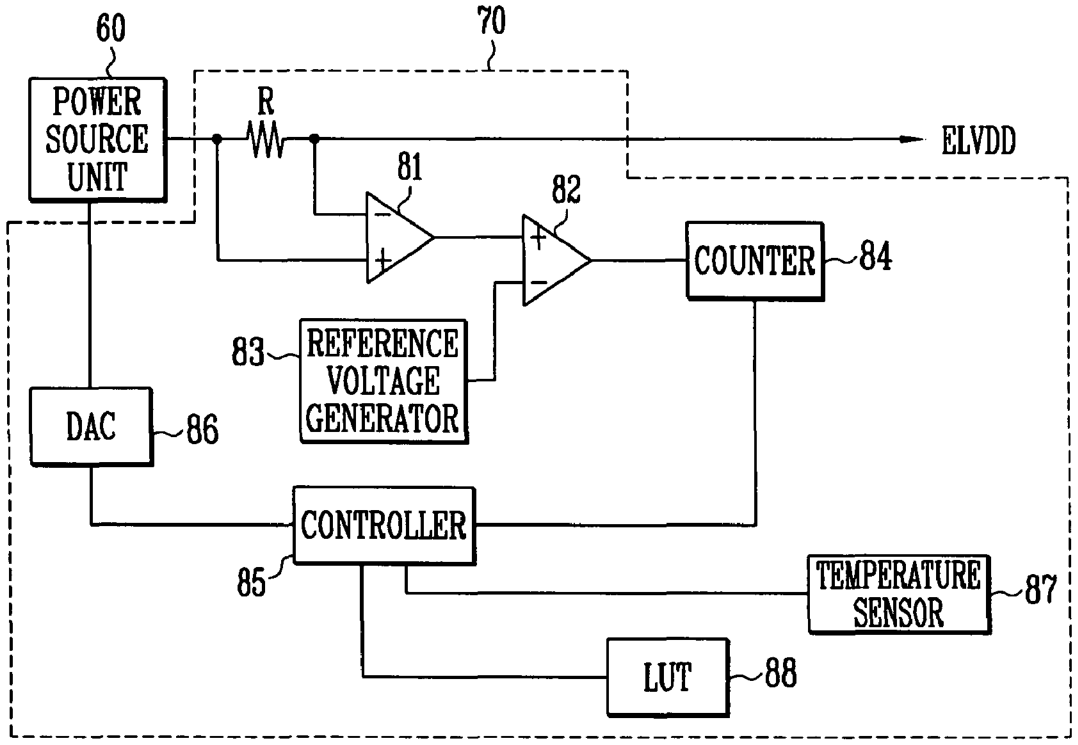
FIG. 4 illustrates a view of a second example of a compensating unit shown in FIG. 2.
FIG. 5 illustrates a view of an example of control values stored in a look-up table of in FIG. 4.

FIG. 4 illustrates a view of a second embodiment of the compensating unit of FIG. 2.

With reference to FIG. 4, the compensating unit 70 may include the resistor R an amplifier 81, a comparator 82, a reference voltage generator 83, a counter 84, a controller 85, a DAC 86, a look-up table (LUT) 88, and a temperature sensor 87.

The power source unit 60 may generate the first power source ELVDD having a predetermined voltage. The power source unit 60 may include a DC-DC converter. The DC-DC converter may be, e.g., an inductor, a transformer, etc.

The resistor R may be between the power source unit 60 and the pixels 40. When the first power source ELVDD generated by the power source unit 60 is supplied to the pixels 40, a predetermined voltage may be applied across the resistor R by an electric current flowing to the resistor R. The amplifier 81 may amplify a voltage across the resistor R.

The reference voltage generator 83 may generate a predetermined reference voltage, and may provide the generated reference voltage to the comparator 82. The reference voltage may be set to a voltage corresponding to an initial electric current of the display. During an initial drive of the display, where the pixels 40 emit full white light, when a voltage (a voltage obtained by amplifying a voltage applied to the resistor R) output from the amplifier 81 may be about 3V, the reference voltage may be set to about 3V. The reference voltage may be experimentally determined based on an initial electric current of the display.

The comparator 82 may compare a voltage across the resistor R, supplied from the amplifier 81, with the reference voltage. When the voltage across the resistor R supplied from the amplifier 81 is greater than the reference voltage, the comparator 82 may output a high level signal. In the remaining cases, the comparator 82 may output a low level signal.

The counter 84 may generate a counter signal counting up or down a count according to an output signal of the comparator 82. When a high level signal of the comparator 82 is input to the counter 84, the counter 84 may generate a counter signal counting down a count to a predetermined value. When a low level signal of the comparator 82 is input to the counter 84, the counter 84 may generate a counter signal counting up a count to a predetermined value.

The temperature sensor 87 may measure a temperature of a panel, and may provide the measured temperature of the panel to the controller 85.

The LUT 88 may store a predetermined control value corresponding to a temperature of the panel. When the same electric current flows to the pixels 40, luminance of the pixels 40 may change according to the temperature of the panel. As shown in FIG. 5, the LUT 88 may store control values corresponding to the temperature of the panel in order to compensate for temperature characteristics.

In FIG. 5, as temperature is increased, the control value stored in the LUT 88 may be reduced. The control value may be set so that characteristics of pixels having high luminance may be compensated as the temperature is increased. The control values stored in the LUT 88 may be experimentally determined in order to compensate for the temperature characteristics. Optionally, the temperature sensor 87 and the look up table 88 may be omitted.

The controller 85 may extract control values from the LUT 88 corresponding to the temperature measured by the temperature sensor 87. The controller 85 may sum up the control values and the counter signal from the counter 84 to generate a compensating signal, and may provide the compensating signal to the DAC 86.

The DAC 86 may convert the compensating signal into an analog signal, and may provide the analog signal to the power source unit 60. The power source unit 60 may control the voltage of the first source ELVDD according to the compensating signal.

When a power source is supplied to the display during an initial time period, the pixels 40 maybe set to emit full white light. The comparator 82 may compare a voltage difference with the reference voltage, and may provide a comparison result signal to the counter 84. The counter 84 may generate a counter signal according the comparison result signal, and may provide the counter signal to the controller 85.

When the controller 85 receives the counter signal, it may sum up control values extracted from the LUT 88 and the counter signal to generate a compensating signal. The controller 85 may provide the generated compensating signal to the power source unit 60 through the digital-to-analog converter 86. The power source unit 60 may change a voltage value of the first power source ELVDD corresponding to the compensating signal. When power is supplied to the display, the aforementioned operation may be performed at least once so that the voltage across the resistor R may be substantially identical or similar to the reference voltage. The voltage of the first source ELVDD may thus be set so that a desired electric current flows through the pixels 40. Images of desired luminance may accordingly be displayed regardless of the degradation of the OLED. Furthermore, in the second embodiment of the present invention, because the ADC and the EEPROM are not used, the present invention may be readily applied to an IC, thereby reducing manufacturing cost.

Although it may be assumed that the red pixel, the green pixel, and the blue pixel receive the first power source ELVDD having the same voltage, the embodiments of the present invention are not limited thereto. For luminance balance, first power sources ELVDD of different voltages may be supplied to the red pixel, the green pixel, and the blue pixel.

Figure 6:
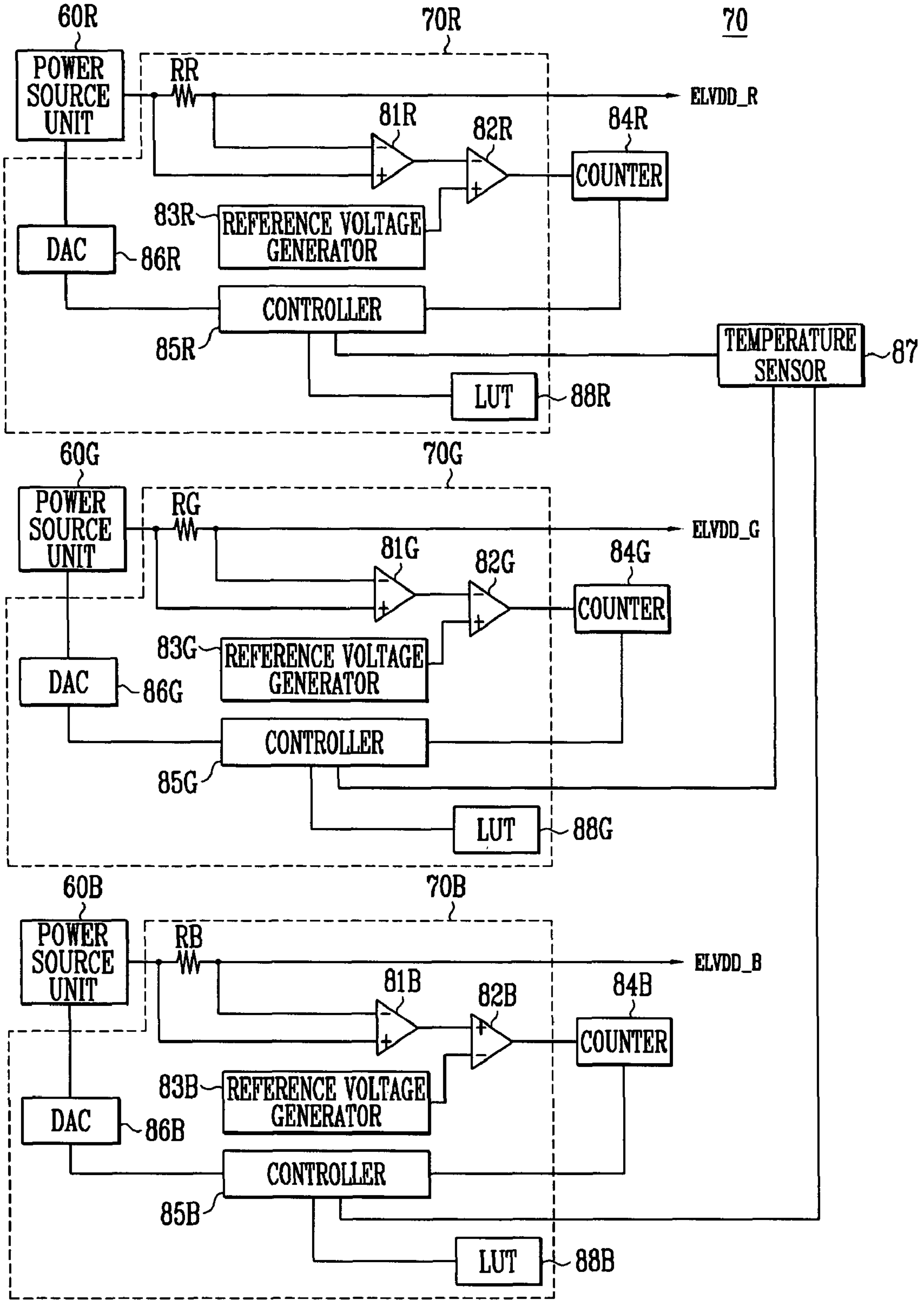
FIG. 6 illustrates a view of a compensating unit when first power sources of different voltages are supplied to red, green, and blue pixels.

FIG. 6 illustrates a view of a compensating unit when first power sources of different voltages are supplied to red, green, and blue pixels.

The construction of the circuit shown in FIG. 6, which is analogous the embodiment shown in FIG. 4, will not be explained in detail to avoid repetition.

Referring to FIG. 6, the compensating unit 70 may include a red compensating unit 70R, a green compensating unit 70G, a blue compensating unit 70B, and a temperature sensor 87. The red compensating unit 70R may include a resistor RR, an amplifier 81R, a comparator 82R, a reference voltage generator 83R, a counter 84R, a controller 85R, a DAC 86R, and a look-up table LUT 88R. The green compensating unit 70G may include a resistor RG, an amplifier 81G, a comparator 82G, a reference voltage generator 83G, a counter 84G, a controller 85R, a DAC 86G, and a look-up table LUT 88G. The blue compensating unit 70B may include a resistor RB, an amplifier 81B, a comparator 82B, a reference voltage generator 83B, a counter 84B, a controller 85B, a DAC 86B, and a look-up table LUT 88B. The compensating unit 70 may also include a red power source unit 60R, a green power source unit 60G, and a blue power source unit 60B.

The red compensating unit 70R, the green compensating unit 70G, and the blue compensating unit 70B may be substantially identical to those shown in FIG. 4. The difference resides in that the red compensating unit 70R may compensate an electric current value according to a voltage of a first red power source ELVDD_R generated by a red power source unit 60R, the green compensating unit 70G may compensate an electric current value according to a voltage of a first green power source ELVDD_G generated by a green power source unit 60G, and the blue compensating unit 70B may compensate an electric current value according to a voltage of a first blue power source ELVDD_B generated by a blue power source unit 60B.

The red power source unit 60R may generate the first red power source ELVDD_R based on characteristics of red OLEDs included in red pixels. A reference voltage generator 83R included in the red compensating unit 70R may generate a reference voltage corresponding to a voltage of the first red power source ELVDD_R.

The green power source unit 60G may generate the first green power source ELVDD_G based on characteristics of green OLEDs included in green pixels. A reference voltage generator 83G included in the green compensating unit 70G may generate a reference voltage corresponding to a voltage of the first green power source ELVDD_G.

The blue power source unit 60B may generate the first blue power source ELVDD_B based on characteristics of blue OLEDs included in blue pixels. A reference voltage generator 83B included in the blue compensating unit 70B may generate a reference voltage corresponding to a voltage of the first blue power source ELVDD_B.

The display of FIG. 2 may be driven in an analog or digital manner. The analog driving may charge a storage capacitor included in each of the pixels 40 with a predetermined voltage, and may supply an electric current corresponding to the charged voltage to the OLED in order to display images. The digital driving may divide one frame into multiple sub frames, and control emission or non-emission of the pixels 40 during each sub frame in order to display images. When the display is driven by either one of the analog or digital drive modes, a voltage of the first power source ELVDD may be controlled to display images of desired luminance.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A organic light emitting display, comprising:

a scan driver connected to scan lines;

a data driver connected to data lines;

pixels connected to the scan lines and the data lines, the pixels being adapted to generate light while applying an electric current from a first power source to a second power source through an organic light emitting diode;

a power source unit adapted to generate the first power source; and a compensating unit adapted to control a voltage value of the first power source, the compensating unit including a resistor between the power source unit and the pixels, an amplifier adapted to amplify a voltage across the resistor, a reference voltage generator adapted to generate a reference voltage, a comparator adapted to compare the amplified voltage with the reference voltage, a counter adapted to generate a counter signal counting up or down a count according to a comparison result of the comparator, and a controller adapted to supply a feedback signal to the power source unit, the feedback signal being generated in accordance with the counter signal.

2. The organic light emitting display as claimed in claim 1, wherein the compensating unit is adapted to control the voltage of the first power source according to an amount of the electric current applied to the pixels.

3. The organic light emitting display as claimed in claim 2, wherein the compensating unit is adapted to control the voltage of the first power source at least once when the first and second power sources are applied to the display.

4. The organic light emitting display as claimed in claim 1, wherein the compensating unit is adapted to apply the reference voltage across the resistor when the pixels emit full white light during an initial drive, and to set the reference voltage to be substantially identical to the voltage amplified by the amplifier.

5. The organic light emitting display as claimed in claim 1, wherein the comparator is adapted to generate the counter signal so that the amplified voltage from the amplifier becomes substantially identical to the reference voltage.

6. The organic light emitting display as claimed in claim 1, wherein the compensating unit includes:

a temperature sensor adapted to measure a temperature of a panel; and a look-up table adapted to store control values corresponding to the temperature measured by the temperature sensor.

7. The organic light emitting display as claimed in claim 6, wherein the control values are set to be reduced as the temperature is increased.

8. The organic light emitting display as claimed in claim 6, wherein the controller is adapted to extract a control value from the look-up table according to the temperature, and the controller is adapted to sum up the extracted control value and the counter signal to generate the compensating signal.

9. The organic light emitting display as claimed in claim 1, wherein the power source unit is adapted to control a voltage of the first power source according to the feedback signal.

10. The organic light emitting display as claimed in claim 2, wherein the power source unit includes:

a red power source unit adapted to generate a first red power source supplied to red pixels;

a green power source unit adapted to generate a first green power source supplied to green pixels; and a blue power source unit adapted to generate a first blue power source supplied to blue pixels.

11. The organic light emitting display as claimed in claim 10, wherein the compensating unit includes:

a red compensating unit adapted to control the voltage of the first red power source;

a green compensating unit adapted to control the voltage of the first green power source; and a blue compensating unit adapted to control the voltage of the first blue power source, when a power source is input to the organic light emitting display.

12. The organic light emitting display as claimed in claim 11, wherein each of the red compensating unit, the green compensating unit, and the blue compensating unit includes:

a resistor between the red power source unit, the green power source unit, or the blue power source unit and the pixels;

an amplifier adapted to amplify a voltage across the resistor;

a reference voltage generator adapted to generate a reference voltage;

a comparator adapted to compare the amplified voltage from the amplifier with the reference voltage;

a counter adapted to generate a counter signal counting up or down a count according the comparison result of the comparator;

a controller adapted to transfer the counter signal to a digital-to-analog converter as a compensating signal; and the digital-to-analog converter adapted to convert the compensating signal into an analog signal.

13. The organic light emitting display as claimed in claim 12, wherein the comparator is adapted to generate the counter signal so that the amplified voltage from the amplifier becomes substantially identical to the reference voltage.

14. The organic light emitting display as claimed in claim 12, wherein the compensating unit includes:

a temperature sensor adapted to measure a temperature of a panel; and a look-up table installed in each of the red compensating unit, the green compensating unit, and the blue compensating unit, the look-up table being adapted to store control values corresponding to the temperature measured by the temperature sensor.

15. The organic light emitting display as claimed in claim 14, wherein the compensating unit is adapted to set the control values to be reduced as the temperature is increased.

16. The organic light emitting display as claimed in claim 15, wherein the controller is adapted to extract the control values from the look-up table according to the temperature, and to sum up the extracted control values and the counter signal to generate the compensating signal.

17. A method for driving an organic light emitting display including pixels for generating light using an electric current from a first source to a second power source through an organic light emitting diode, the method comprising:

(i) generating the first power source by a power source unit;

(ii) amplifying a voltage across a resistor installed between the first power source and the pixels;

(iii) comparing the amplified voltage with a reference voltage, and generating a counter signal according to the comparison result so that the amplified voltage becomes identical with the reference voltage;

(iv) transferring the counter signal to a digital-analog converter as a compensating signal;

(v) supplying the compensating signal converted into an analog digital signal by the digital-analog converter to the power source unit; and (vi) controlling a voltage of the first power source by the power source unit according to the compensating signal, wherein the reference voltage is set to be substantially the same voltage as the amplified voltage during an initial drive.

18. The method as claimed in claim 17, further comprising:

measuring a temperature of a panel; and extracting a control value stored in a look-up table corresponding to the measured temperature of the panel; and summing the control value and the counter signal to generate the compensating signal.

19. The method as claimed in claim 18, wherein the control value is reduced as the temperature is increased.

* * * * *